UNITED STATES PATENT OFFICE.

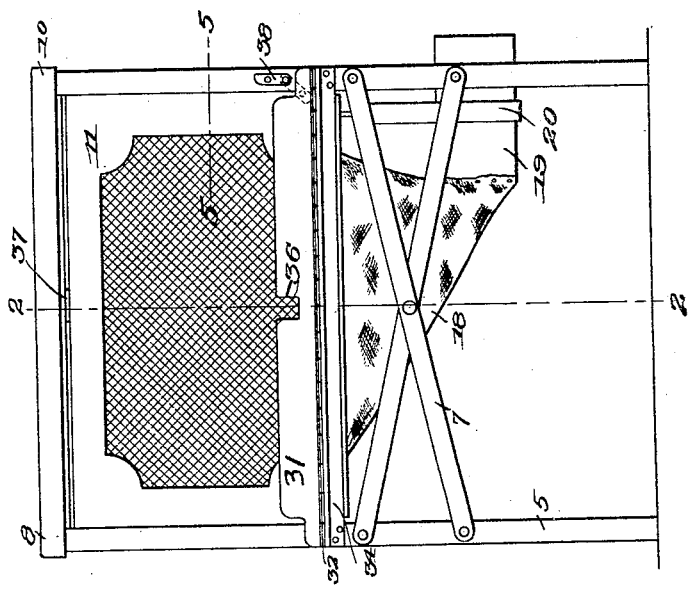

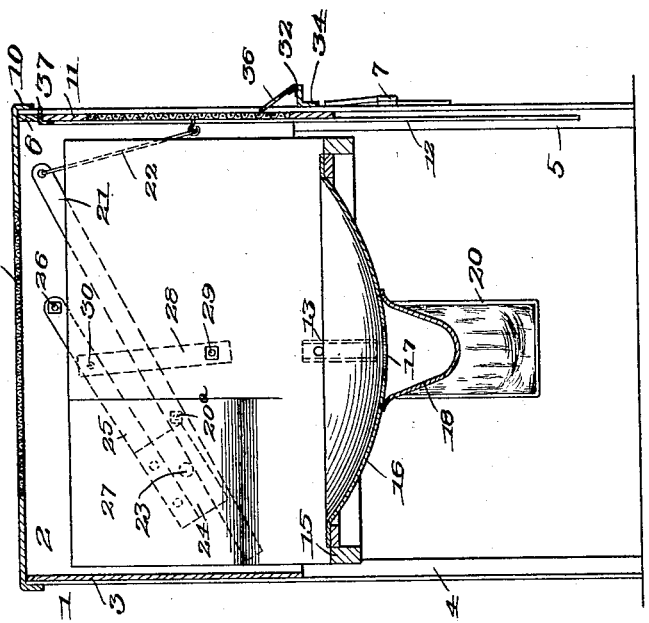

EDWHIN O. BRANINGTON, OF ROCHESTER, NEW YORK, ASSIGNOR OF ONE-HALF TO ANDREW HOCHREITER, OF ROCHESTER, NEW YORK.

TRAP-NEST.

1,118,262.   Specification of Letters Patent.   Patented Nov. 24, 1914.

Application filed May 21, 1913. Serial No. 768,942.

*To all whom it may concern:*

Be it known that I, EDWHIN O. BRANINGTON, of Rochester, in the county of Monroe and State of New York, have invented a new and useful Improvement in Trap-Nests, which improvement is fully set forth in the following specification and shown in the accompanying drawings.

My present invention relates to trap nests and has for an object to provide an improved means by which the entrance door will be closed as soon as the hen occupies the nest, and its escape thereby prevented until released by an attendant.

In poultry yards where select stock is kept it is desirable that the eggs laid by each hen be properly recorded and it is another object of this invention to provide means whereby the egg laid by a hen occupying a nest will operate a signal calling the notice of an attendant in order that the hen may be released and the egg properly credited.

To these and other ends the invention consists in certain parts and combinations of parts all of which will be hereinafter described, the novel features being pointed out in the appended claims.

In the drawings: Figure 1 is a front elevation of a nest constructed in accordance with my invention, showing the door closed; Fig. 2 is a vertical sectional view on the line 2—2 of Fig. 1 showing the door in open position; Fig. 3 is a similar view with the door closed; Fig. 4 is a vertical sectional view on the line 4—4 of Fig. 2; and Fig. 5 is a detail sectional view on the line 5—5 of Fig. 1.

The nest embodies a casing 1 preferably formed of the side walls 2 and back 3 of sheet metal and united at their meeting edges by the angle irons 4 which project beyond the bottom of the casing to form rear supporting legs therefor. The front of the casing is left open and the angle bars 5 secured to the front edges of the side walls 2 and constituting the front legs are connected at their upper ends by a cross bar 6 and beneath the casing by the cross bars 7. A top 8, provided with a suitable ventilating aperture covered with wire netting 9, is secured in place by the depending flanges 10. The door or closure 11, also provided with a ventilating opening similarly covered with netting, is movable vertically in guides 12 on the front angles 5 and, when open, occupies the position shown in Fig. 2, with its upper edge about even with the lower edge of the casing. Carried by and depending from the sides 2 are guides 13 in which slide blocks 14 on a frame 15 vertically movable in the casing. A cloth or other suitable flexible material 16 extends across the frame and constitutes the nest proper, a slight amount of slack being allowed so that an egg laid therein will gravitate toward the center where it will fall through an aperture 17 therein and be conducted by a chute 18 of similar flexible material without danger of breakage to a padded repository or pocket 19 carried on a hanger 20 depending from the frame 15. The pocket 19 is open at the top and, inasmuch as it is located beneath the lower edge of the casing, an egg contained therein is easy of access to the attendant.

The nest 16 and door 11 are operatively connected so that they normally counterbalance each other, but, when the nest is occupied, it will fall and raise the door as shown in Figs. 1 and 3 to prevent the escape of the hen. Pivoted at 20ª above the guide 13 on the sides 2 are levers 21 connected at their forward ends by links 22 to the door, their rear ends being engaged by pins 23 extending laterally from plates 24 at the extremities of levers 25 pivoted at 26 to the casing. The nest frame 16 is provided with upwardly extending shields 27 which effectually cover the levers, and afford a convenient means of attaching links 28 which are connected thereto at 29 and to the levers 25 intermediate of their ends at the point 30. It will be seen from an inspection of Fig. 2 that downward motion of the nest causes the levers 25 to bear downwardly on the rear ends of levers 21 and on account of the relative locations of the pivots, an amplified movement is transmitted to the door 11.

It will be seen that the top of the door is about the same level in Fig. 2 as the nest frame and in order to bridge the gap between the two so that there will be no danger to the hen's feet while entering, I provide a member or plate 31 hinged at 32 on a bar 34 extending across between the angle irons 5 and in front of the door. When the door rises, the plate is deflected upwardly and assumes the position shown in Fig. 3 riding against the front face of the door. The plate 31 is notched at 36 to receive a finger piece 37 projecting forwardly from the upper edge of the door. When the attendant presses down on the finger piece to open the door, the plate 31 falls by gravity as soon as the door reaches its lowermost position. In case it is desired for any reason to prevent the operation of the door, a gravity latch 38 may be swung down over the plate 31 as shown in dotted lines in Fig. 1.

In order to call to the notice of the attendant, the fact that an egg has been laid, a spring arm 39 is located at the bottom of the chute 18 and adapted to be deflected by the weight of an egg into contact with a terminal 40 of an annunciator circuit 4 operated from a source of electrical energy 42. In order for the egg to arrive at the pocket 19 it must pass by and depress the arm 39 to close the circuit and operate the annunciator 43. The interior lining 18ª forming a portion of the chute covers the contact 39 to prevent injury to the eggs.

Of course where a plurality of nests are employed each has its separate annunciator, thereby obviating the necessity of a personal inspection of each nest to see if it is occupied and if any egg has been laid.

What I claim as my invention and desire to secure by Letters Patent is:

1. The combination with a casing having an opening at one side, a vertically movable door for said opening, and a nest mounted to move vertically in the casing, of a lever pivoted to the casing and connected at one end to the door, and a second lever pivoted to the casing, slidably engaging the first lever and actuated by the nest.

2. The combination with a casing having an opening at one side, a vertically movable door for said opening, and a nest mounted to move vertically in the casing, of a lever pivoted at one end to the casing and connected intermediate of its ends to the nest, a second lever pivoted intermediate of its ends to the casing, the free end of the first named lever slidably engaging one end of the second lever and the opposite end of the second lever being connected to the door.

3. The combination with a casing having an opening in one side, a vertically movable door movable upwardly to close the opening, and a nest movably mounted within the casing, of two pairs of levers mounted within the casing above the nest, the pairs being arranged on opposite sides of the nest and the lower member of each pair being connected on one side of its pivot to the door and slidably engaged on the other side of its pivot by one end of the upper lever, and the upper lever being connected with the nest at a point between said engaging end and the pivot of said upper lever.

4. The combination with a casing having an opening therein, a vertically movable door adapted to move upwardly to close the opening, and a movably mounted nest in the casing connected to the door for raising the latter, of a hinged member adapted to project over the top of the door when the latter is open into proximity to the nest, and to be deflected to one side of the door when the latter is elevated, and a latch for engaging the hinged member to prevent its deflection.

EDWHIN O. BRANINGTON.

Witnesses:
 HAROLD H. SIMMS,
 ADA M. WHITMORE.